Patented Oct. 11, 1949

2,484,483

UNITED STATES PATENT OFFICE 2,484,483

POLYTETRAFLUOROETHYLENE DISPERSIONS

Kenneth L. Berry, Hockessin, Del., assignor to E. I. du Pont de Nemours & Company, Wilmington, Del., a corporation of Delaware No Drawing. Application July 26, 1945, Serial No. 607,255

9 Claims. (Cl. 260—32.8)

1

This invention relates to dispersions of polymeric materials and more particularly to dispersions of copolymers of tetrafluoroethylene.

The tetrafluoroethylene copolymers used in the practice of this invention can be obtained, for example, by heating at polymerizing temperature (40° C. to 150° C.) mixtures of tetrafluoroethylene and another polymerizable unsaturated compound under superatmospheric pressure in the presence of water, organic solvents or mixtures of water and an organic solvent, using oxygen, an organic peroxy compound, such as benzoyl peroxide, or a water soluble salt of a peracid, such as ammonium persulfate, as the catalyst. These macromolecular copolymers particularly those containing tetrafluoroethylene in major amounts, are characterized by their high melting point, generally above 240° C., their nonworkability and insolubility in common organic solvents. While this combination of properties is very desirable for a great many applications, these very properties make these copolymers unavailable for other uses. For many applications there are advantages in the use of solutions rather than molten compositions to achieve the fluid state necessary in lacquers, coating compositions, and dopes suitable for use in forming various objects such as films, sheets, ribbons, bristles and filaments. However, since these copolymers are soluble only at high temperature in a limited number of solvents, the use of a solution of the above mentioned copolymers for the formation of coatings and films, is obviously attended with various difficulties, because the use of such a solution is limited to elevated temperatures which cannot be maintained conveniently.

This invention has as an object a liquid tetrafluoroethylene copolymer composition which can be handled either at room temperature, namely at 25° C. or below, or at higher temperatures, which requires no dispersing agent, and which will give continuous, tough coatings or films upon evaporation of the liquid medium at elevated temperatures. A further object is a liquid tetrafluoroethylene/ethylene copolymer composition having the above mentioned properties. Other objects will appear hereinafter.

The above objects are accomplished by a dispersion of a tetrafluoroethylene copolymer containing tetrafluoroethylene in major amount in a normally liquid organic medium boiling above 175° C., said liquid medium being selected from the group consisting of neutral esters of carboxylic acids, and ketones. These organic liquids are nonsolvents for the copolymer at normal temperatures but swell, soften or dissolve the copolymer

2 when the dispersion is heated to the boiling point of the medium.

The dispersions of this invention are characterized by low viscosities at 25° C., near that of the liquid vehicle alone, at 15–20% solids content and at this concentration they are practically nonthixotropic. Their viscosities increase with concentration and at about 35–40% solids they resemble thin pastes. Thixotropy increases somewhat with solids content. These dispersions are, in addition to other reasons, advantageous because they require no dispersing agents which might alter the properties of polymer articles prepared therefrom and because they are devoid of any tendency to coagulate or "break" under such conditions as maintaining frozen in a solid state at —78° C. for 30 minutes, heating to approximately 200° C. for 10 minutes, storing at ordinary room conditions for 1 year, agitating violently, and diluting with various organic liquids such as alcohol, acetone, and kerosene. The individual particles of the dispersions have diameters in the range from 0.1 to about 15 microns but those having particles in the diameter range of about 3–8 microns are particularly valuable. In any one preparation the particles have unusual uniformity of size.

The following examples are illustrative of the new liquid tetrafluoroethylene copolymer compositions described herein, and of methods for preparing these liquid compositions.

Example I

A mixture of one part of tetrafluoroethylene/ethylene copolymer having a mole ratio of tetrafluoroethylene to ethylene of 1:1.4 (71.8% tetrafluoroethylene) and three parts of diisobutyl adipate are placed in a vessel equipped with a stirrer and surrounded by a fused salt heat transfer bath. The temperature of the bath is raised as rapidly as possible to 290° C. At 230° C. the polymer is completely dissolved and the solution gives the appearance of boiling, although the temperature is below the boiling point of diisobutyl adipate. As the temperature of the solution approaches 290° C. the bubbling subsides. The heating is then discontinued and the temperature of the solution allowed to decrease. As the temperature approaches 230° C. the rate of cooling is decreased, the solution is vigorously stirred until the precipitation of the copolymer from the solution is complete. The mixture is then cooled to room temperature at any convenient rate. The dispersion obtained is very fluid and is concentrated to about 40% solids by removing part of the diisobutyl adipate by centrifuging. A portion of the dispersion is converted to a dimethyl phthalate vehicle which is a nonsolvent for the copolymer but exerts a swelling action when the dispersion is heated at elevated temperature, by filtering the dispersion, washing the finely divided copolymer particles with dimethyl phthalate until free of diisobutyl adipate and then dispersing the polymer in dimethyl phthalate by vigorous stirring at room temperature. The latter dispersion is useful for coating wire.

*Example II*

Eighty-five and six-tenths parts of a dispersion of tetrafluoroethylene/ethylene copolymer (74.8% tetrafluoroethylene) in diisobutyl adipate which had been prepared by the process as described in Example 1, is filtered to remove the polymer particles. The finely divided polymer is then redispersed by stirring into a mixture of four parts of kerosene and one part of diisobutyl adipate. A smooth continuous adherent tough coating of the copolymer on copper wire is obtained by passing the wire through this dispersion and then through an oven maintained at 450° C.

*Example III*

An equimolar mixture of tetrafluoroethylene and ethylene is injected under pressure of 250–300 p. s. i. into an agitated pressure vessel containing a mixture of seven parts tertiary butanol, one part water, and a small amount of ammonium persulfate catalyst maintained at 60° C. During one hour there is obtained a 10% dispersion of tetrafluoroethylene/ethylene 1:1.57 interpolymer in the liquid reaction medium. To one part of this dispersion 1.1 parts of dimethyl phthalate is added and the mixture heated until free of tertiary butanol and water. There is obtained a smooth dispersion suitable for applying the polymer in the form of a thin, adherent film to wire by the procedure described in Example 2.

This dispersion is particularly suitable for coating glass fabrics because the polymer particles are of smaller size and the dispersion is somewhat more thixotropic than those obtained in Examples 1 and 2.

*Example IV*

A dispersion of tetrafluoroethylene/ethylene copolymer (76.2% tetrafluoroethylene) in diisobutyl adipate which has been prepared by the process of Example 1, is filtered to obtain the finely divided copolymer particles. A smooth, fluid dispersion of this copolymer in isofenchone is obtained by vigorously stirring three parts of these copolymer particles in seven parts of isofenchone. The dispersion is useful for coating wire by the method described in Example 2.

Although the invention is illustrated by dispersions of tetrafluoroethylene/ethylene copolymers, dispersions can be prepared in like manner from all copolymers of tetrafluoroethylene which contain the tetrafluoroethylene in amounts ranging from above 50% to 85%, in a liquid medium boiling above 175° C. said medium being selected from the group consisting of neutral esters and ketones. These copolymers include the macromolecular polymerization products of tetrafluoroethylene with one or more other polymerizable unsaturated compounds. Examples include copolymers of tetrafluoroethylene with olefinic hydrocarbons, such as ethylene and styrene; halogenated ethylenes such as vinyl chloride, vinylidene chloride and chlorotrifluoroethylene; vinyl esters of monocarboxylic acids, such as vinyl acetate, and alkyl esters of acrylic acid and alpha-substituted acrylic acids such as ethyl acrylate and methyl methacrylate. Dispersions of copolymers of tetrafluoroethylene with ethylene and particularly those which contain from 60 to 85% of tetrafluoroethylene, are preferred because these dispersions are the most valuable for use in coating copper wires for electrical insulating purposes.

As media in which the tetrafluoroethylene copolymers ared ispersed, any neutral ester or ketone boiling above 175° C. can be used. These neutral esters and ketones swell, soften or dissolve the copolymer at the boiling point of the medium employed. Examples of such esters and ketones include ethyl caprylate, methyl laurate, methyl palmitate, methyl oleate, and ethyl benzoate; neutral esters of dicarboxylic acids such as diethyl oxalate, dimethyl malonate, dimethyl succinate, dimethyl glutarate, dimethyl adipate, diethyl adiate, dimethyl azelate, dibutyl sebacate, dimethyl phthalate, dibutyl phthalate and dimethyl hexahydrophthalate and tributyl phosphate. Examples of ketones which can be used as the liquid medium for the dispersion of this invention include isofenchone, isophorone, fenchone, phorone, acetophenone, benzophenone and a mixture of unsaturated cyclic ketones boiling within the range of 250–325° C., and which contain from 12 to 18 carbon atoms. For many coating and impregnating operations, it is desirable to use a diluent in combination with the high boiling ester or ketone in order to diminish the solubility of the copolymer in the dispersion medium. These diluents do not swell, soften or dissolve the copolymers. Examples of such diluents include hydrocarbon fractions such as kerosene, and high boiling ethers and alcohols. The present dispersions usually contain, on the basis of the total weight of the dispersion from 10% to 50% of the tetrafluoroethylene copolymer. If desired the dispersions can be modified by the inclusion of such materials as pigments, plasticizers, waxes, resins, agents to promote adhesion or to facilitate stripping, metal powder and the like.

The present dispersions can be applied to the articles to be coated in a fluid condition at normal temperature and a product obtained, after removal of the liquid medium at elevated temperature, having properties similar to those of products obtained from hot solutions or melt. This is a decided advantage in an industrial operation since it permits the use of lower temperature.

The dispersions described herein are particularly useful for the impregnation of paper, fabrics and other porous and semiporous materials. They are valuable for coating and impregnating glass fabrics, metal surfaces and for the preparation of unsupported films. They are particularly useful for preparing films, coatings and impregnations where outstanding resistance to heat, chemical agents and electrical stresses or combinations of these are desired. The present dispersions are also valuable for preparing finely divided tetrafluoroethylene copolymers which can be isolated from the dispersion by centrifuging or filtering the dispersion to remove the liquid medium.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a dispersion in an anhydrous normally liquid organic medium of a copolymer of tetrafluorethylene and another polymerizable monoethylenically unsaturated compound dispersed in a particle size of from 0.1 to 15 microns throughout said medium, said copolymer consisting of from 50% to 85% combined tetrafluoroethylene, said organic liquid medium being one which boils above 175° C., and which is selected from the group consisting of ketones and neutral esters of carboxylic acids.

2. A liquid composition which comprises a liquid medium and a tetrafluoroethylene copolymer and which can be applied at ordinary temperature to yield on evaporation of said medium at temperatures above 175° C., continuous, tough, films; said composition comprising a dispersion essentially stable against coagulation which comprises a copolymer of tetrafluoroethylene and another polymerizable monoethylenically unsaturated compound dispersed in a particle size of from 0.1 to 15 microns throughout an anhydrous normally liquid organic medium which boils above 175° C., which is a non-solvent for said copolymer at atmospheric temperature, and which is selected from the group consisting of ketones and neutral esters of carboxylic acids, said copolymer consisting of from 50% to 85% of combined tetrafluoroethylene.

3. The composition defined in claim 2 in which said tetrafluoroethylene copolymer is a tetrafluoroethylene/ethylene copolymer consisting of from 50% to 85% of combined tetrafluoroethylene.

4. The composition defined in claim 2 in which said liquid medium is dimethyl phthalate.

5. The composition defined in claim 2 in which said liquid medium is diisobutyl adipate.

6. The composition defined in claim 2 in which said liquid medium is dimethyl phthalate and in which said tetrafluoroethylene copolymer is a tetrafluoroethylene/ethylene copolymer consisting of from 50% to 85% of combined tetrafluoroethylene.

7. The composition defined in claim 2 in which said liquid medium is diisobutyl adipate and in which said tetrafluoroethylene copolymer is a tetrafluoroethylene/ethylene copolymer consisting of from 50% to 85% of combined tetrafluoroethylene.

8. The composition set forth in claim 1 in which said liquid organic medium is a neutral ester of a carboxylic acid.

9. The composition set forth in claim 8 in which said tetrafluoroethylene copolymer is a tetrafluoroethylene/ethylene copolymer consisting of from 50% to 85% of combined tetrafluoroethylene.

KENNETH L. BERRY.

REFERENCES CITED

The following references are of record in the file of this patent:

UNITED STATES PATENTS

| Number | Name | Date |
|---|---|---|
| 2,334,195 | Hopff et al. | Nov. 16, 1943 |
| 2,384,848 | Peters | Sept. 18, 1945 |
| 2,393,967 | Brubaker | Feb. 5, 1946 |
| 2,412,960 | Berry | Dec. 24, 1946 |
| 2,448,952 | Berry | Sept. 7, 1948 |